United States Patent
Rendi et al.

[11] Patent Number: 5,991,672
[45] Date of Patent: Nov. 23, 1999

[54] VEHICLE ANTI-LOCK BRAKE SYSTEM DEMONSTRATION

[75] Inventors: Anthony J. Rendi, Canton; Howard Churchwell, Harper Woods, both of Mich.

[73] Assignee: Ford Motor Company, Dearborn, Mich.

[21] Appl. No.: 08/819,383

[22] Filed: Mar. 17, 1997

[51] Int. Cl.[6] ........................................................ G06F 7/00
[52] U.S. Cl. ........................ 701/30; 701/29; 701/71; 701/78; 303/122.02; 303/122.06
[58] Field of Search .................................. 701/1, 29, 30, 701/70, 74, 78, 79, 80; 180/197, 233, 247, 249; 303/155, 157, 138, 122.06, 122.02, 34, 65, 71

[56] References Cited

U.S. PATENT DOCUMENTS

| | | | |
|---|---|---|---|
| 4,733,920 | 3/1988 | Panbacker | 303/195 |
| 4,957,329 | 9/1990 | Matsuda | 303/159 |
| 5,429,428 | 7/1995 | Yasuda | 303/169 |
| 5,655,618 | 8/1997 | Wilson et al. | 180/197 |
| 5,697,861 | 12/1997 | Wilson | 180/249 |
| 5,737,711 | 4/1998 | Abe | 701/29 |

OTHER PUBLICATIONS

Ford Motor Co. Service Manual for 1966 Contour and Mystique Automobiles, pp. 06–09–1 through 06–09–17.

*Primary Examiner*—William A. Cuchlinski, Jr.
*Assistant Examiner*—Gertrude Arthur
*Attorney, Agent, or Firm*—Gregory P. Brown

[57] ABSTRACT

A diagnostic readout tool can be programmed to generate and deliver electronic signals representative of different road wheel slippage conditions on various road surfaces, such as ice, snow, gravel or dry pavement. The artificially-created signals can be applied to an electronic control module in a vehicle anti-lock brake system, thereby permitting a person seated in the vehicle to experience the action and feel of the anti-lock brake operation while the vehicle is in a stand-still condition.

9 Claims, 3 Drawing Sheets

VEHICLE ANTI-LOCK BRAKE SYSTEM DEMONSTRATION

BACKGROUND OF THE INVENTION

1. Field of the Invention

This invention relates to vehicle anti-lock braking systems, and particularly to brake simulation mechanisms used with such systems.

2. Description of the Related Art

Vehicle anti-locking brake control systems differ from conventional brake systems in that the hydraulic pressure is applied to the brake cylinders as a series of time-spaced pulses, in order to prevent the road wheels from skidding or sliding on low friction road surfaces, e.g. snow, ice or loose gravel. A person accustomed to the steady state action of conventional brake systems is sometimes surprised by the pulsing action of anti-lock brake systems. Occasionally persons purchasing a vehicle equipped with anti-lock brakes will complain to the dealer that the brakes seem to be defective, due to the pulsating effect perceived at the brake pedal.

When such complaints are received, the normal practice is to have the salesperson and customer make a road test of the vehicle. During such a test, the salesperson can point out to the customer that the pulsating brake action is a normal condition, not a product defect. However, a road test is somewhat costly and time-consuming, as well as a customer inconvenience and possibly a cause of an accident due to preoccupation with pedal action.

The present invention relates to a mechanism that can be used to simulate normal operation of a vehicle anti-lock braking system, without requiring a vehicle road test.

SUMMARY OF THE INVENTION

The invention relates to electronic mechanism for applying road wheel slippage signals to an electronic control module of an anti-lock brake system while the vehicle is in a stand-still condition. A person seated in the vehicle's driver seat can depress the brake pedal and experience the pulsating effect associated with actual operation of an anti-lock brake system during hard braking in the real time environment. The invention is a low cost method of informing and instructing a vehicle owner as to the normal pedal feel and pulsation effects and pump noise experienced with anti-lock braking systems.

DETAILED DESCRIPTION OF THE PREFERRED EMBODIMENTS

Figure 1:
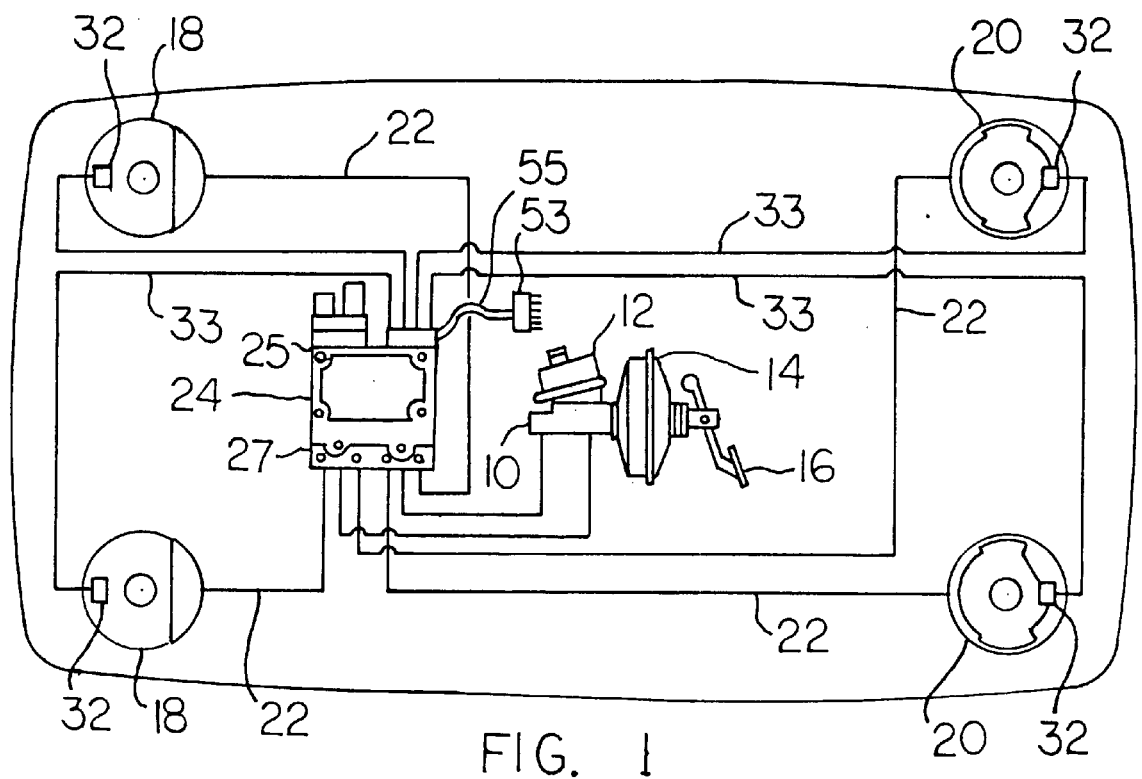
FIG. 1 is a diagrammatic representation of a vehicle equipped with an anti-lock braking system that forms the environment for the present invention.

The drawings show a conventional anti-lock vehicle braking system that includes a brake master cylinder 10 having a hydraulic fluid reservoir 12, a vacuum-operated booster 14, actuating foot pedal 16, front wheel brake assemblies 18, and rear wheel brake assemblies 20. Each brake assembly includes a brake cylinder that is supplied with pressurized brake fluid by a hydraulic line 22.

Figure 4:
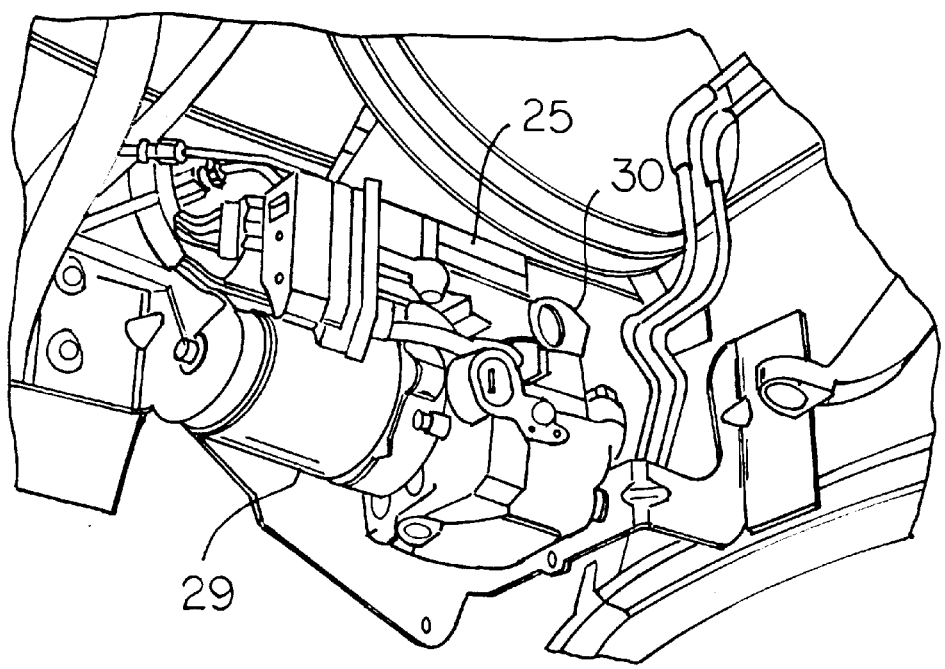
FIG. 4 is a perspective view of a brake control unit in a vehicle environment in which the invention can be used.

The anti-lock feature is provided by a central electronic-hydraulic control unit 24 that includes an electronic control module 25 and a hydraulic power unit 27. The hydraulic power unit comprises a hydraulic pump 29 (FIG. 4) and solenoid valves 30 for controlling hydraulic pressure in each hydraulic line 22. During anti-lock brake action the solenoid valves are cycled on and off (opened or closed) to raise or lower the pressure at the wheel cylinders, whereby the vehicle is prevented from skidding or sliding in an uncontrolled fashion.

Figure 2:
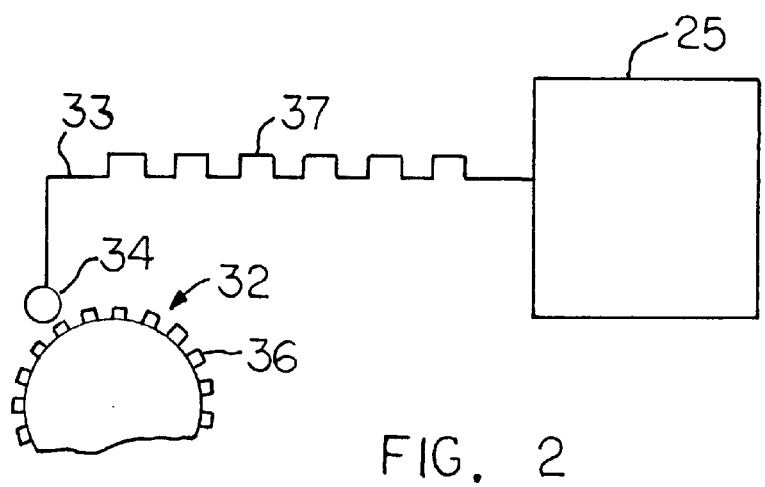
FIG. 2 is a diagrammatic representation of the operation of a road wheel speed sensor in the FIG. 1 anti-lock brake system.

Electronic control module 25 comprises a computer that receives electronic control signals from wheel speed sensors 32 via electric lines 33. As shown diagrammatically in FIG. 2, each wheel speed sensor comprises a magnetic pick up 34 in near proximity to magnetically permeable teeth 36 on the shaft of the rotating road wheel, whereby the sensor generates an electronic pulse 37 having a frequency related to wheel speed. The electronic module 25 compares the pulses generated by the wheel speed sensors to determine how the solenoid valves 30 are to be controlled (cycled). The system uses current supplied by the vehicle battery for energizing the solenoid valves in variable pulse fashion (several times per second).

Figure 3:
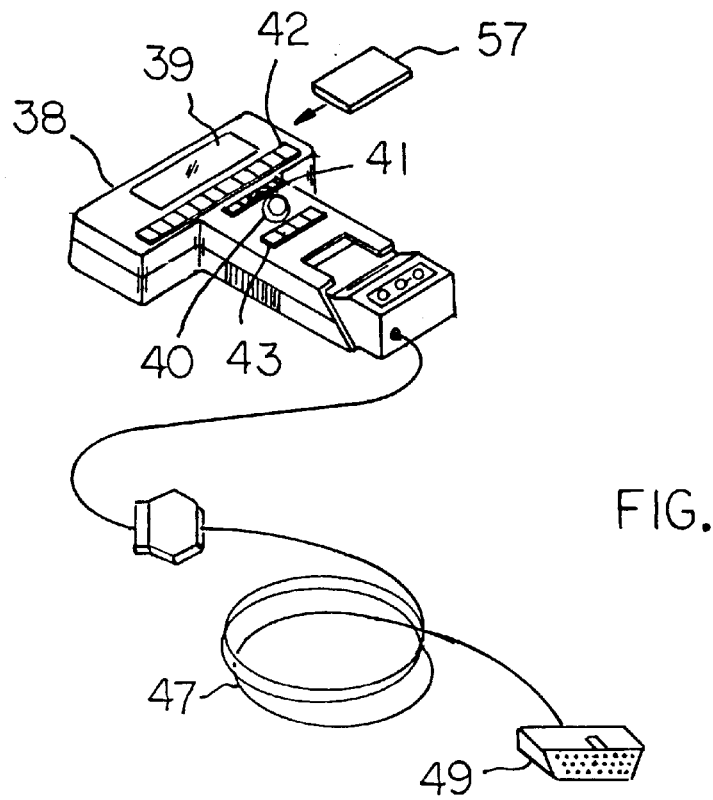
FIG. 3 is a diagnostic trouble code readout tool that can be used with the FIG. 1 vehicle to practice the present invention.

The electronic control unit is equipped with an on-board self-testing system designed to detect malfunctions in the electronic control module or associated components, e.g. the wheel speed sensors, pump motor, or solenoid valves. This self testing system is normally energized by an external (portable) diagnostic readout tool 38 (FIG. 3) having a display screen 39 adapted to display alpha numeric diagnostic trouble codes detected by the self testing system. Readout tool 38 can be a commercially available structure manufactured by the Hickock Electrical Instrument Co., of Cleveland, Ohio, under its parts designation No. 2490-822. As shown in FIG. 3, the readout tool is equipped with a menu dial control 40, cancel keys 41, screen button keys 42, and trigger keys 43. The tool includes a vehicle interface module 45 that has a cable 47 connected to a vehicle data link connector 49. Connector 49 has plural electrical sockets adapted to plug onto pin terminals 51 of a data link connector 53 located in the vehicle, e.g. under the steering column. Data link connector 53 has a permanent cable connector 55 with electronic control module 25, such that when connector 49 is plugged into data link connector 53 electrical connections are established between control module 25 and readout tool 38.

Figure 5:
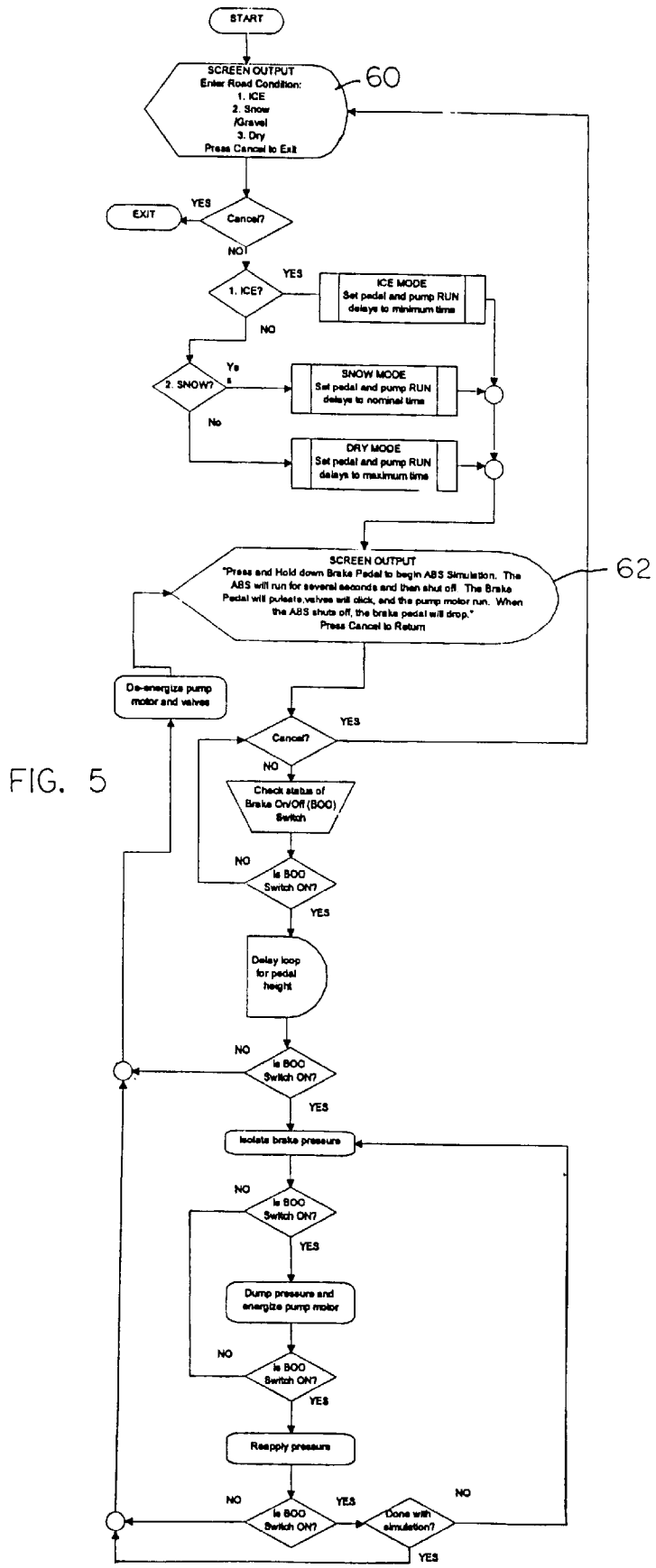
FIG. 5 is a flow chart of a computer program that can be used to practice the invention.

Tool 38 has a side access slot adapted to selectively receive different program cards appropriate to different vehicle makes and models. When the appropriate card is inserted into the access slot in tool 38 the tool is conditioned to display alpha numeric diagnostic trouble codes detected by the self testing system in module 25. The self testing system has a scanning (multiplexed) capability that can be sequentially connected to different points in the electronic control module 25, e.g. the solenoid valve terminals, the origination points for wheel speed sensor lines 33, and the pump 29 motor energization terminals. The self test system detects voltages, resistances or current valves that are outside the ranges required for proper operation of the electronic brake control system. Any out-of-range value is transmitted through data link connector 53 to the readout tool where it is displayed as an alpha numeric trouble code on display screen 39. The present invention uses the readout tool 38 as a signal delivery device, rather than as a signal receiver device. A program, constructed according to the FIG. 5 flowchart, is incorporated into a program card 57 sized for insertion into the side access slot in readout tool 38. With program card 57 inserted into the access slot, tool 38 is adapted to function as a device for transmitting substitute control signals representative of anti-lock brake variables, e.g. pedal height, pump and valve operation profile and wheel slippage (incorporated on card 57) to the data line connector 53 on board the vehicle. The data link connector transmits such control signals to the line 33 origination points on electronic control module 25, whereby the control module functions as though the vehicle were moving on road terrain corresponding to the pulse frequency being transmitted from card 57 to data link connector 53.

The program contained on card 57 has an electric output corresponding to three different road wheel slippage conditions on ice, or snow and gravel, or dry pavement. These pulsed outputs are incorporated into card 57 on the basis of prior knowledge gained from experimental oscilloscope instrumentation on test vehicles.

Readout tool 38 can have various operational modes displayable on screen 39 by manual manipulation of menu dial control 40. Two such operational modes are the vehicle-engine selection mode, and the diagnostic data link mode. Assuming the readout tool is placed in the data link mode, the program card 57 will cause various instructions to appear on display screen 39, in accordance with the program depicted in flow chart form in FIG. 5.

In a typical scenario the brake simulation test operation will be carried out in a showroom atmosphere on a normally-operating vehicle, with a customer seated in the vehicle (that is equipped with the readout tool 38). With the vehicle in a stand-still condition the vehicle ignition switch will be turned to the engine running condition (but with the vehicle in a stand still condition), whereby electrical power is supplied to electronic control module 25. The salesperson or service technician will handle readout tool 38 while the customer is seated in the driver's seat. The display screen displays a first question 60 (FIG. 5) on the display screen 39; after receiving the appropriate decision (selection) from the customer, the salesperson presses the appropriate buttons on the readout tool to advance the program to the next decision point represented by the second question 62 displayed on the screen. The customer is then in position to carry out a test of the anti-lock brake system while the vehicle remains in the stand-still condition. The test can be carried out (or repeated), using different simulated road conditions (pulse frequencies). The test closely approximates actual anti-lock brake operation in actual on-the-road conditions.

The system depicted in the drawings uses existing electronic modules and readout tools. The mechanism for generating the substitute wheel speed signals and delivering such signals to the data link connector 53 can be incorporated entirely on program card 57. Readout tool 38 is unmodified, and in its original condition, with its normal trouble code readout and display capabilities retained.

The drawings show one specific form that the invention can take. However, it will be appreciated that the invention can be practiced in various forms and configurations.

What is claimed:

1. A mechanism for simulating the operation of a vehicle anti-lock braking system, wherein said system comprises a brake pedal, an electronic-hydraulic control unit that includes a hydraulic pump and solenoid valve means controlling the hydraulic pressure pulse rate to the road wheel brake cylinders, and wheel speed sensors delivering control signals to the electronics in said control unit representative of road wheel slippage, said mechanism comprising:

removable means operable while the vehicle is in a stand still condition for generating substitute control signals that include signal pulses representative of wheel slippage experienced by a moving vehicle while undergoing a braking action; and means for delivering the substitute control signals to the control unit, whereby a person operating the brake pedal experiences the feedback that would be experienced during a braking action on a moving vehicle.

2. The mechanism of claim 1, wherein said signal generating means comprises an external program connectable to the electronics in said control unit.

3. The mechanism of claim 2, wherein said program is embodied in a diagnostic readout tool normally used to read and display trouble codes relating to operability of the wheel speed sensors.

4. The mechanism of claim 3, wherein said program is contained on a card that is insertable into the readout tool to activate the program.

5. The mechanism of claim 1, wherein said signal generating means comprises an external program that includes three separate sub-programs representative of wheel slippage conditions on ice, or snow and gravel, or dry pavement.

6. The mechanism of claim 5, wherein said program includes instructions for selectively running the sub-programs.

7. The mechanism of claim 6, wherein each sub-program generates a different electronic signal profile representative of a particular road condition.

8. The mechanism of claim 5, wherein said external program is contained on a card that is insertable into a readout tool normally used to read and display trouble codes relating to operability of the wheel speed sensors and control unit.

9. The mechanism of claim 8, wherein said program is self-contained on the card, whereby the readout tool retains its normal code readout and display capabilities.

* * * * *